Oct. 16, 1934.  G. DÉSAGNAT  1,976,986

DECORATIVE LINING FOR WALLS OR OTHER PARTITIONS

Filed Jan. 12, 1933

G. Désagnat
INVENTOR

By: Marks & Clerk
Attys.

Patented Oct. 16, 1934

1,976,986

UNITED STATES PATENT OFFICE 1,976,986

DECORATIVE LINING FOR WALLS OR OTHER PARTITIONS

Gaston Désagnat, Paris, France

Application January 12, 1933, Serial No. 651,436
In France January 20, 1932

3 Claims. (Cl. 72—23)

REISSUED
DEC 5 1939

The present invention has for its object improvements in linings comprising a rigid decorative material which is stuck on the wall, ceiling, or other partition to be lined, with interposition of a swan-skin sheet or other sheet of similar flexible material.

It has been noticed in certain cases, and particularly when these linings are subjected to weather conditions, that moisture can rise along the swan-skin sheet by capillarity, this being very prejudicious to the strength of the lining, in some cases, the swan-skin sheet even rotting with time.

According to the invention, these inconveniences are overcome by using, instead of the swan-skin sheet, a fabric having a looser texture, which is glued on the wall to be lined by means of an adhesive which, upon sticking, penetrates the fabric, impregnates it and renders it impervious.

Thus, very satisfactory results have been obtained with a ribbed tricot which is stuck on the wall to be lined by means of mastic.

Such a substratum is particularly suitable for providing linings by a method which consists in glueing on a sheet of flexible material a decorative plate, made of opaline glass for instance, in cutting out the latter into small elements, and in subsequently glueing the sheet of flexible material on the wall to be coated. In fact, the said decorative plate is glued only on the ridges of the ribs of the face of the tricot on which it is applied; the tricot thus practically preserves its entire distortableness, and, after the plate is cut out into small elements, the entire structure has the desired flexibility and stretching capacity, in particular in order that it may be applied on curved or more or less plain surfaces.

Moreover, when the tricot is subsequently stuck on the wall to be lined, by using mastic for instance, the mastic impregnates the tricot and even enters the joints between the small cut-out elements, producing from the interior a real calking, if only the lining is applied with a certain pressure on the wall adapted to receive it.

Such calking is so much the more advantageous that, up to the present, it had not been possible to fill up or stop up from the exterior the joints existing between the small cut out elements.

The most varied decorative effects can also be obtained by using mastics of the same colour as the decorative plate, or of colours to match.

Of course, use can also be made, in combination with the above rigid plate, of decorative products in sheets, plates, or under any other form, glued for instance under the said rigid plate where the latter is made of transparent glass.

The accompanying drawing, illustrates, by way of example only, a form of carrying out the subject-matter of the invention.

Figure 1:
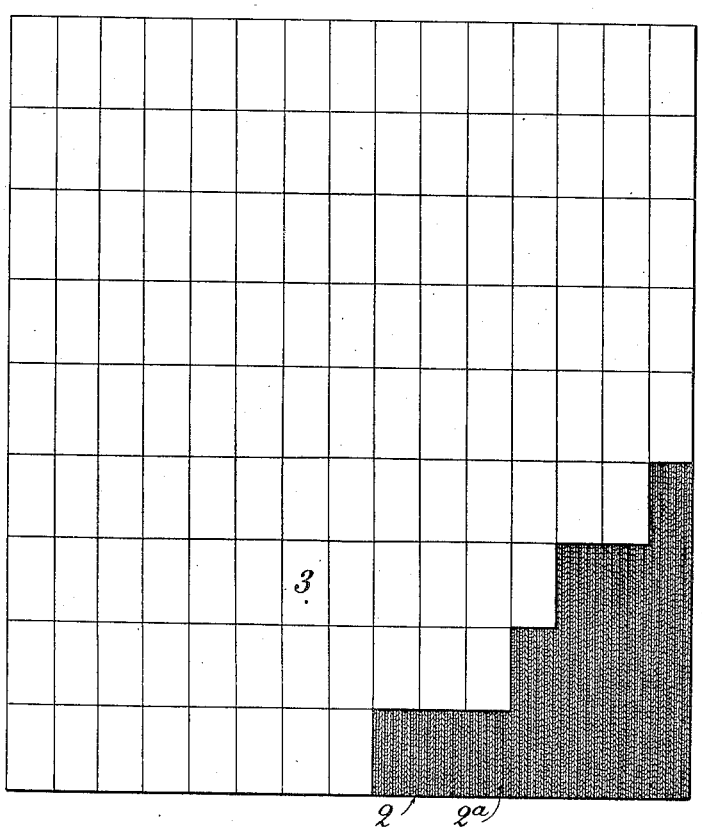
Fig. 1 is an elevation of this form of construction, parts being broken away.

This lining comprises a decorative plate made of rigid material, for instance of opaline glass, adapted to cover a wall 1 on which it is secured in the following manner;

It is first glued on a tricot 2, having ribs 2a, so as to adhere only on the ridges of the ribs on which it is applied, then it is eventually cut out in contiguous elements 3, the dimensions of which depend on the desired decorative effect, on the curvature of the surface to be lined, etc.

Moreover, it is to be noted that the arrangement of the whole, and particularly the flexibility of the tricot and the capability it retains of stretching and of being locally distorted, owing to the fact that it is rendered rigid with the small rigid plates 3 only by the ridges of its ribs 2a, allows to apply this lining on surfaces having a somewhat small radius of curvature relatively to the dimensions of the elements 3, and this without creasing, wrinkling, or tearing of the tricot.

Figure 2:
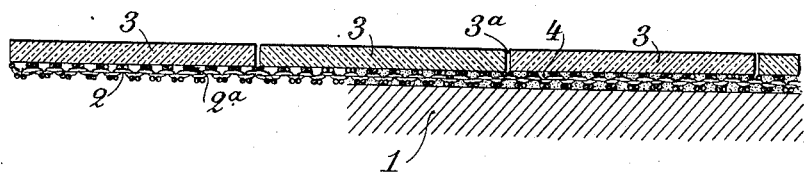
Fig. 2 is a horizontal section thereof.

This lining is secured on the wall 1 (see the right-hand portion of Fig. 2) by means of mastic 4 or other suitable adhesive.

Upon glueing, and owing to the relatively loose texture of the tricot, the latter is completely impregnated with the adhesive which renders it impervious and unliable to rot.

If the lining is firmly applied on the wall 1, this loose texture of the tricot also allows the mastic to be forced into the joints 3a existing between the elements 3, so as to calk these joints.

Such calking has a twofold advantage: On one hand, it contributes to render the lining perfectly smooth and impervious and thus to prevent in particular moisture from stagnating in the joints 3a, and, on the other hand, it constitutes between the small plates 3 a binding holding these plates perfectly in position and it gives great strength to the lining.

Finally, as above stated, it is possible to use adhesives having suitable colours for producing most varied decorative effects.

I claim:—

1. A decorative lining adapted to be directly secured, by means of an adhesive, on a wall to be coated, comprising a rigid decorative plate, such as a glass sheet, glued on a support constituted by a sheet of flexible material, extensible and compressible in any direction, having a texture sufficiently loose to be impregnated throughout its thickness by the adhesive serving to secure it on the wall to be coated.

2. A decorative lining for walls, comprising the combination of a decorative rigid plate, such as a glass sheet, and of a sheet of flexible, extensible and compressible material united by glueing, the said sheet of flexible material being adapted to be glued to a wall and sufficiently loose to be completely impregnated by the glue.

3. A decoratitve lining adapted to be directly secured, by means of an adhesive, on a wall to be coated, comprising a rigid decorative plate, such as a glass sheet, glued on a support constituted by a sheet of flexible material, extensible and compressible in any direction, having a texture sufficiently loose to be impregnated throughout its thickness by the adhesive serving to secure it on the wall to be coated, the said rigid plate being cut out in small elements.

GASTON DÉSAGNAT.